(12) United States Patent
Strecker et al.

(10) Patent No.: US 9,239,005 B2
(45) Date of Patent: Jan. 19, 2016

(54) COOLING SYSTEM FOR ENGINE AND AIRCRAFT AIR

(75) Inventors: Steven Strecker, Erin (CA); Xiaoliu Liu, Mississauga (CA); Adam Logan, Toronto (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 1016 days.

(21) Appl. No.: 13/304,477

(22) Filed: Nov. 25, 2011

(65) Prior Publication Data

US 2013/0133334 A1     May 30, 2013

(51) Int. Cl.
*F02C 6/08* (2006.01)
*F02C 7/18* (2006.01)
*B64D 13/06* (2006.01)

(52) U.S. Cl.
CPC . *F02C 6/08* (2013.01); *B64D 13/06* (2013.01); *F02C 7/18* (2013.01); *B64D 2013/0607* (2013.01); *B64D 2013/0618* (2013.01)

(58) Field of Classification Search
CPC .............. F02C 7/047; F02C 7/06; F02C 7/12; F02C 7/18; F02C 7/185; F02C 9/18; F02C 9/52; F02C 6/08; F05D 2260/20; F05D 2260/213; F01D 25/12; F01D 25/125; F01D 25/183; B64D 2013/0618; B64D 13/08
USPC .............. 60/782, 785, 795, 806, 39.83, 39.08
See application file for complete search history.

(56) References Cited

U.S. PATENT DOCUMENTS

| | | | |
|---|---|---|---|
| 3,981,466 A | 9/1976 | Shah | |
| 4,482,114 A | 11/1984 | Gupta et al. | |
| 4,550,561 A * | 11/1985 | Coffinberry | 60/782 |
| 5,137,230 A | 8/1992 | Coffinberry | |
| 5,203,163 A * | 4/1993 | Parsons | 60/226.1 |
| 6,305,156 B1 | 10/2001 | Lui | |
| 6,415,595 B1 * | 7/2002 | Wilmot et al. | 60/785 |
| 6,442,944 B1 | 9/2002 | Skur, III | |
| 6,460,353 B2 | 10/2002 | Udobot et al. | |
| 6,796,131 B2 | 9/2004 | Sampson | |
| 6,817,575 B1 | 11/2004 | Munoz et al. | |
| 7,856,824 B2 | 12/2010 | Anderson et al. | |
| 2004/0107702 A1 * | 6/2004 | Nichols et al. | 60/782 |
| 2005/0172612 A1 * | 8/2005 | Yamanaka et al. | 60/272 |
| 2009/0188232 A1 * | 7/2009 | Suciu et al. | 60/39.83 |
| 2010/0192593 A1 * | 8/2010 | Brown et al. | 60/782 |

* cited by examiner

*Primary Examiner* — Andrew Nguyen
(74) *Attorney, Agent, or Firm* — Norton Rose Fulbright Canada LLP

(57) ABSTRACT

The combined cooling system uses a single heat exchanger to cool both engine air for use in an engine system and aircraft air for use in an aircraft system. More particularly, a bleed air path leads from the compressor stage to the heat exchanger where it is placed in thermal exchange contact with a flow of cooling air coming from a cooling path. From an outlet end of the heat exchanger, the bleed air splits into two paths: an aircraft air path leading to at least one aircraft system such as an Environmental control system (ECS), a wind de-icing system or the like, and an engine air path leading to at least one engine system such as a buffer air system for pressurizing the bearing cavities.

18 Claims, 3 Drawing Sheets

COOLING SYSTEM FOR ENGINE AND AIRCRAFT AIR

TECHNICAL FIELD

The specification relates generally to aircraft air cooling systems and, more particularly, to systems used to cool pressurized bleed air from the engine prior to subsequent use.

BACKGROUND OF THE ART

Some aircraft systems, such as environmental control systems (ECS) and wing de-icing systems for instance, require pressurized air from the engine within pre-established pressure and/or temperature specifications. In the case of ECS, for instance, it was known to use pressurized air from a compressor stage of the gas turbine engine via a bleed air conduit, and to cool this pressurized air in a dedicated heat exchanger, referred to as the ECS pre-cooler, provided as part of the aircraft.

Engine systems, such as bearing cavities for the rotary components of gas turbine engines, also require pressurized air (referred to as buffer air) within pre-established pressure and/or temperature specifications. The engine systems requirements can significantly differ from the pressure and/or temperature specification of aircraft systems. The engine (buffer) air cooling system thus used a dedicated heat exchanger provided as part of the gas turbine engine.

There remained room for improvement in the way the cooling of engine air and/or aircraft air was handled.

SUMMARY

In one aspect, there is provided a cooling system for an aircraft having a gas turbine engine, the cooling system comprising: a heat exchanger unit; a bleed air path leading from the gas turbine engine to the heat exchanger; a cooling path for bringing cooling medium in thermal exchange contact with the bleed air in the heat exchanger; an engine air path in gas flow communication with the bleed air path through the heat exchanger, leading from the heat exchanger to the engine; and an aircraft air path in gas flow communication with the bleed air path through the heat exchanger, leading from the heat exchanger to the aircraft.

In a second aspect, there is provided a method of determining a capacity of the heat exchanger unit for a combined cooling system, the method comprising establishing an engine air cooling requirement over a given operating envelope, establishing an aircraft air cooling requirement over the given operating envelope, adding the engine air cooling requirement to the aircraft air cooling requirement over the given operating envelope into a combined cooling requirement, determining a maximum combined cooling requirement at a given point of the operating envelope; and determining the capacity of the heat exchanger unit based on the maximum combined cooling requirement.

In a third aspect, there is provided a method of providing pressurized and cooled air to both an aircraft and a gas turbine engine thereof, the method comprising: bleeding pressurized air from the gas turbine engine; exposing the bleed air to thermal exchange contact with cooling medium in a heat exchanger; subsequently to said thermal exposure, channeling a first portion of the bleed air to the aircraft and channeling a second portion of the bleed air to the engine.

In a fourth aspect, there is provided a combined cooling system using a single heat exchanger to cool both engine air for use in an engine system and aircraft air for use in an aircraft system, the combined cooling system comprising: a bleed air path leading from a compressor stage to the heat exchanger where it is placed in thermal exchange contact with a flow of cooling medium coming from a cooling path, the bleed air path splitting into an aircraft air path leading to the aircraft system and an engine air path leading to the engine system downstream of the heat exchanger.

In a fifth aspect, there is provided a gas turbine engine configured for combined cooling of engine air for use in an engine system and aircraft air for use in an aircraft air system of an aircraft by a single heat exchanger unit, the gas turbine engine comprising an engine system inlet exposed for connection with an engine air path in the aircraft, the engine system inlet leading to the engine system, and a bleed air outlet exposed for connection with a bleed air path leading to a heat exchanger in the aircraft, the bleed air outlet being in fluid flow communication with a compressor stage of the engine, the bleed air path splitting into an aircraft air path leading to the aircraft system and the engine air path downstream from the heat exchanger unit.

DESCRIPTION OF THE DRAWINGS

Reference is now made to the accompanying figures, in which.

DETAILED DESCRIPTION

Figure 1:
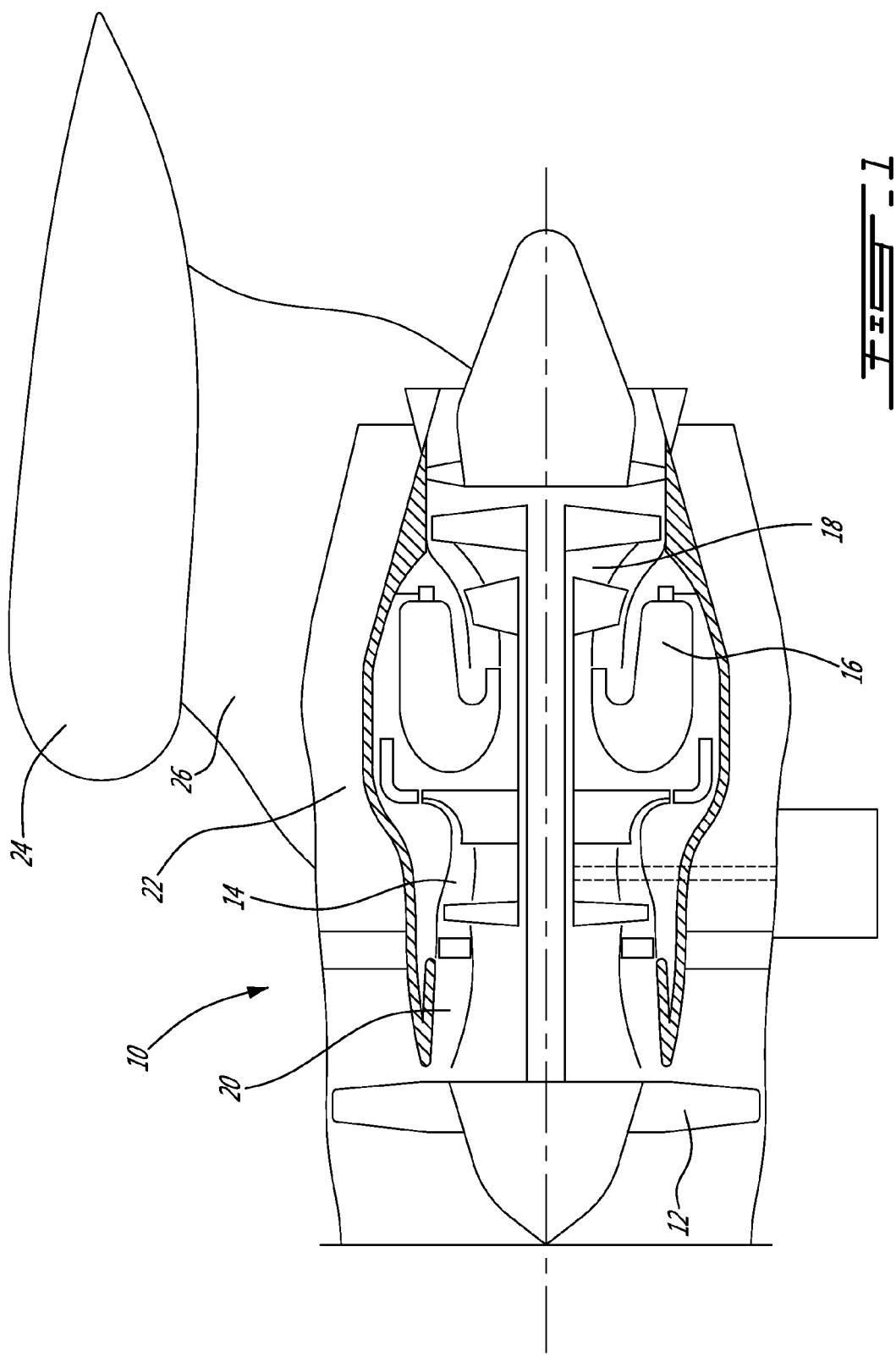
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 12 through which ambient air is propelled into both a compressor duct 20 and a bypass duct 22 extending annularly around the compressor duct 20, a multistage compressor 14 for pressurizing the air, a combustor 16 in which the compressed air is mixed with fuel and ignited for generating an annular stream of hot combustion gases, and a turbine section 18 for extracting energy from the combustion gases. This example of gas turbine engine 10 is typically used for airplane propulsion in which case it can be suspended from a wing 24 or a fuselage (not shown) of the aircraft by a pylon 26. Ducting (not shown) is provided in the pylon 26, between the engine 10 and the wing 24 (or fuselage) to carry bleed air to an aircraft system.

The compressor 14, fan 12, and turbine 18 are rotary components which are mounted on bearings (not shown) and can revolve at very high RPM during operation. The bearings are installed in bearing cavities which can require a supply of pressurized air referred to as buffer air for satisfactory operation.

Figure 2:
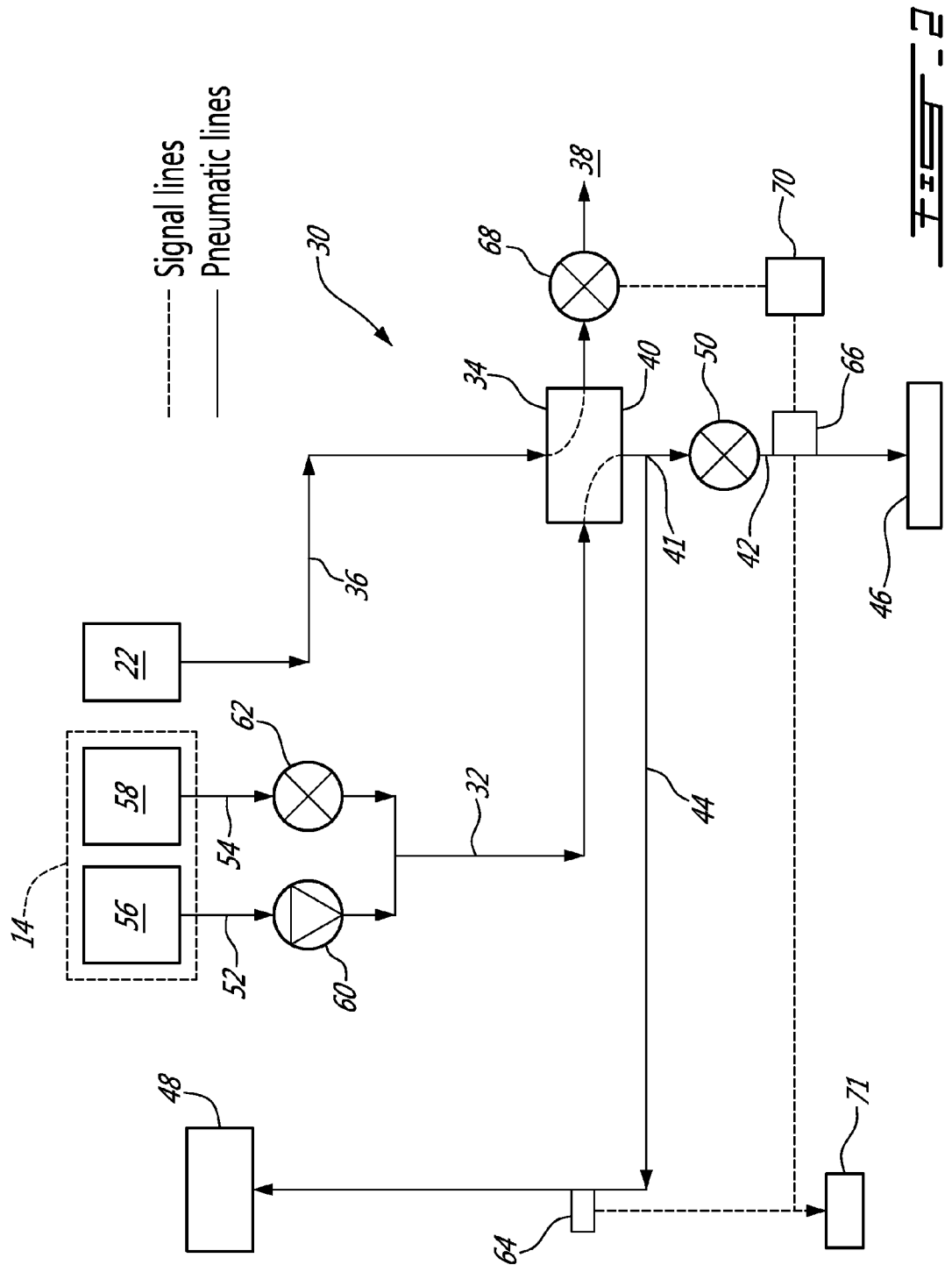
FIG. 2 is a bloc diagram of a combined cooling system.

FIG. 2 illustrates an example of a combined cooling system 30. Taken generally, a bleed air path 32 leads from the compressor stage 14 of the gas turbine engine 10 to a combined heat exchanger 34. In the heat exchanger 34, the bleed air is placed in thermal exchange contact with a flow of cooling medium coming from a cooling path 36 and subsequently exhausted overboard 38. From the outlet end 40 of the heat exchanger 34, the bleed air splits into two paths: an aircraft air path 42 leading to at least one aircraft system 46, such as an Environmental Control System (ECS), a wind de-icing system or the like, and an engine air path 44 leading to at least one engine system 48, such as a buffer air system for pressurizing the bearing cavities.

In the case of a prior art dedicated ECS pre-cooling system, a pressure regulation and shut-off valve (PRSOV) was used in the bleed air path upstream of the heat exchanger. In the case of a prior art dedicated buffer air cooling system, a PRSOV was not required. In the illustrated embodiment of a combined cooling system, this challenge was overcome by positioning a PRSOV 50 in the aircraft air path 42, downstream of the heat exchanger 34. More particularly, at a splitting point 41, the bleed air can split into the engine air path 44 and the aircraft air path 42 by associated ducting (not shown) either downstream of the heat exchanger 34 or directly from the outlet 40 of the heat exchanger 34. In either case, the PRSOV 50 can be positioned downstream of the splitting point 41. In this way the flow demand of the engine buffer air system can be met independently of the aircraft flow requirement, which is controlled by the said PRSOV.

The aircraft system 46 pressure requirements are typically beyond what can be achieved by a single engine compressor stage bleed. To reach them, this embodiment shows using a low-pressure air path 52 having inlet port in the low-pressure stage 56 of the compressor 14 and a high pressure air path 54 having an inlet port in the high pressure stage 58 of the compressor 14, wherein both the low-pressure air path 52 and the high pressure path 54 lead to the bleed air path 32. The low-pressure air path 52 has a check valve 60 and the high-pressure air path 54 has a PRSOV 62 in a manner that the low-pressure air path 52 is favoured when it meets the pressure requirements. In this manner, when the low-pressure compressor stage 56 meets pressure requirements at given operating conditions, the bleed air is obtained from the low-pressure compressor stage 56. However, when the low-pressure air path 52 does not meet the pressure requirements at other given operating conditions, the bleed air is obtained from the high-pressure compressor stage 58.

In this example, dedicated temperature sensors 64, 66 can be used in the engine air path 44 and the aircraft air path 42 to determine to what extent the air contained therein satisfies the temperature specifications. The cooling medium for the heat exchanger 34 can be cooling air obtained from the bypass duct 22 for instance, and the rate of admission thereof can be controlled depending on an input of one or both temperature sensors 64, 66 to provide more or less cooling by allowing a greater or lower rate of admission of cooling air into the heat exchanger 34, for instance. In this specific example, this is achieved by operating an airflow control valve 68 located downstream of the heat exchanger 34. The airflow control valve 68 can be controlled by a processor 70 which receives the input of one or both temperature sensors 64, 66. The temperature sensors 64, 66 can also communicate with an electronic engine control 71, of which the processor 70 can optionally be a part of. The heated cooling air can be evacuated overboard 38 subsequently to its use in the heat exchanger 34.

The combined heat exchanger 34 can be made integral to the engine 10 or to the aircraft. However, because the engine air path 44 involves return ducting leading from the heat exchanger 34 to the engine 10, it can be advantageous to position the combined heat exchanger 34 as close as practicable to the engine 10, if not as part of the engine itself. Alternatively, the combined heat exchanger 34 can be integrated inside the pylon 26 for instance, or in the wing 24 of the aircraft. All of the bleed air path 32, engine air path 44, cooling path 36 and aircraft air path 42 can be embodied by appropriate ducting linking the associated components in gas flow communication between an associated inlet and an associate outlet.

Figure 3:
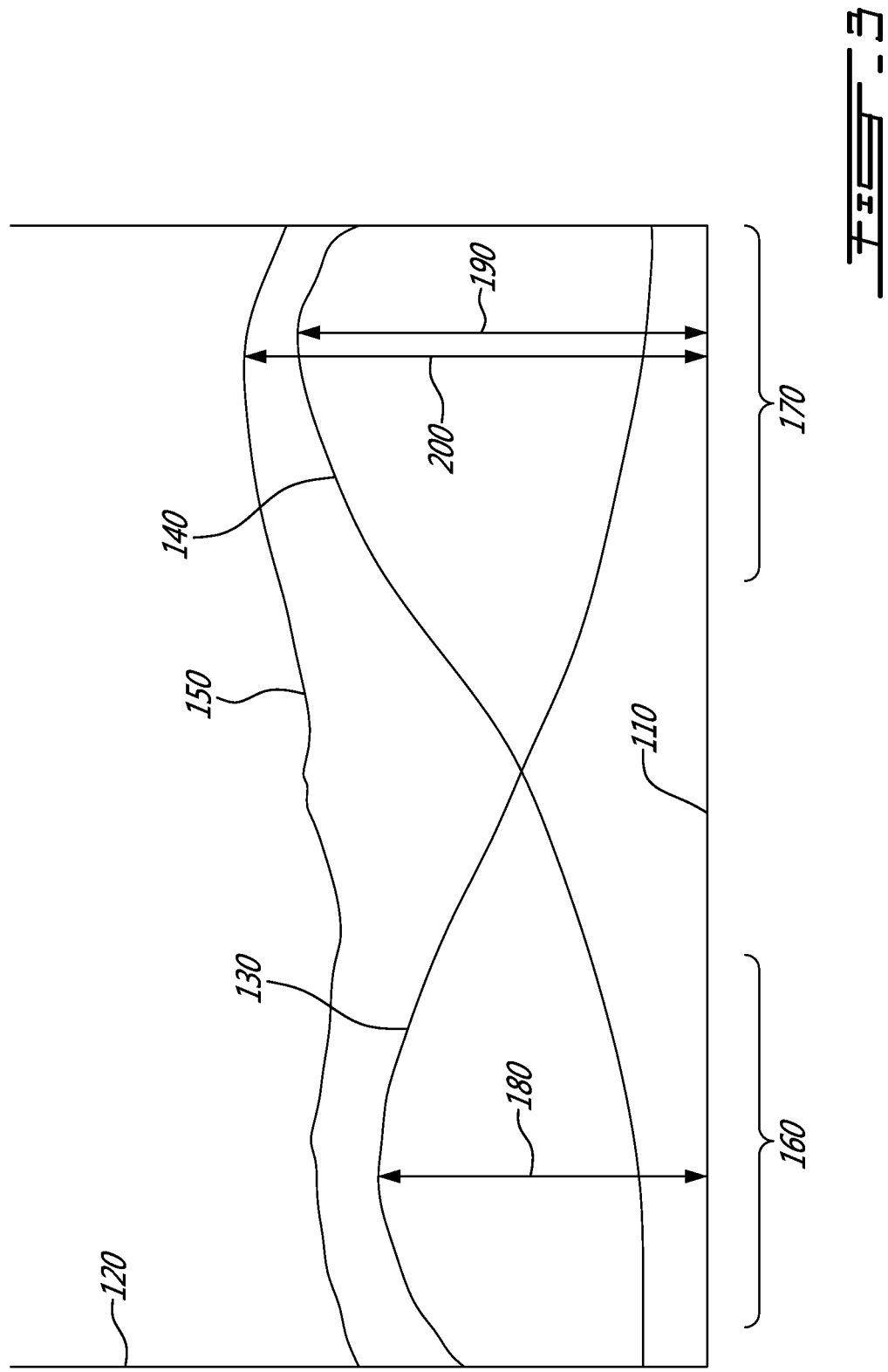
FIG. 3 is a graph showing cooling requirements over an operating envelope.

FIG. 3 schematizes cooling requirements of the cooling system across an operating envelope to provide an example to assist understanding. The horizontal axis 110, or X-axis, represents an operating envelope ranging from high-power/low altitude on the left to a low-power/high altitude on the right. The vertical axis 120, or Y-axis represents the cooling requirements. More specifically an example of an engine air cooling requirement 130 and an example of an aircraft air cooling requirement 140 are shown across the operating envelope, and the sum of both requirements 150 is also shown across the operating envelope. These curves are arbitrary and provided for the sole purpose of assisting in understanding.

As schematized, the most demanding condition for the engine air cooling requirement 130 is at the high-power/low altitude region 160 of the operating envelope 110. Buffer air requirements, for instance, occur at high engine power, such as takeoff conditions, which typically occur at low altitudes such as sea level. On the other hand, the most demanding condition for the aircraft air cooling requirement 140 is in the low-power/high altitude region 170 of the operating envelope 110. For instance, the ECS typically poses the higher requirements when flying at higher altitudes. In the prior art using dedicated heat exchangers, the buffer air heat exchanger was sized according to the maximum engine air cooling requirement 180 and the ECS pre-cooler was sized according to the maximum aircraft air cooling requirement 190. Henceforth, both heat exchangers were significantly oversized over most of their operating envelope and had a relatively low utilization factor when considering the whole operating envelope.

Given the fact that the maximum capacity requirements 180, 190 are located in significantly different locations of the whole operating envelope 110, combining the cooling systems with a single heat exchanger unit can lead to a better utilization factor over the whole operating envelope. Because the most demanding conditions occur at different operating envelopes for the buffer and for the ECS, the combined cooling system capacity 200 can be significantly less than the sum capacity of the former two independent cooling system capacities 180, 190 since the combined cooling system can provide a better utilization factor of the heat exchanger over the whole operating envelope.

More particularly the capacity requirement of the combined heat exchanger can be determined as follows: first, both the engine air cooling requirement 130 and the aircraft air cooling requirement 140 are determined over a whole operating envelope 110 (visualizing this may require a graph having more than two dimensions); the two requirements can then be added to one another over the whole operating envelope to determine a combined cooling requirement 150. A maximum 200 of the combined cooling requirement 150 can be determined at some point or region on the operating envelope 110. The size of the combined heat exchanger can thus be determined based on this maximum value 200 at a single point or region of the operating envelope 110, rather than the sum of the maximum requirements 180, 190 of each subsystem at different points of the operating envelope. The more the maximum requirements of each subsystem differ from one another, the more the benefits of combining the heat exchanger can tend to erode.

The above description is meant to be exemplary only, and one skilled in the art will recognize that changes may be made to the embodiments described without departing from the scope of the invention disclosed. For example, different variants could result depending on the particular configuration of the maximum requirements 180 and 190 of each subsystem, i.e. depending on whether the maximum engine air cooling requirement 180 is equal to, smaller than, or greater than the maximum aircraft air cooling requirement 190. Still other modifications which fall within the scope of the present invention will be apparent to those skilled in the art, in light of a review of this disclosure, and such modifications are intended to fall within the scope of the appended claims.

What is claimed is:

1. A method of providing pressurized and cooled air to both an aircraft and a gas turbine engine thereof, the method comprising:
    bleeding pressurized air from the gas turbine engine;
    exposing the bleed air to thermal exchange contact with cooling medium in a heat exchanger, the heat exchanger having an operating envelope spanning from a high-power/low altitude reaction to a low-power/high altitude region and a capacity based on the entire operating envelope;
    subsequently to said thermal exposure, channeling a first portion of the bleed air to an environmental control system of the aircraft to satisfy an environmental cooling requirement and channelling a second portion of the bleed air to bearing cavities of bearings of rotary components of the gas turbine engine to fulfill a bearing air requirement, wherein the heat exchanger fulfills the environmental cooling requirement and the bearing air requirement across the entire operating envelope;
    wherein the steps of bleeding, exposing, and channeling are performed:
        i) in the high-power/low altitude reaction of the operating envelope during which the first portion of the bleed air has a greater flow rate than the second portion of the bleed air; and
        ii) in the low-power/high altitude region of the operating envelope during which the second portion of the bleed air has a greater flow rate than the first portion of the bleed air.

2. The method of claim 1 wherein the bleeding includes channelling the pressurized air away from the engine and said channelling the second portion of the bleed air includes returning the second portion of the bleed air to the engine.

3. The method of claim 1 wherein said bleeding includes bleeding pressurized air from a low-pressure compressor section if the low-pressure compressor section reaches a given pressure threshold, and bleeding pressurized air from a high-pressure compressor section if the low-pressure compressor section does not reach the given pressure threshold.

4. The method of claim 1 further comprising detecting a temperature of at least one of the first portion of the bleed air and the second portion of the bleed air, and controlling a rate of flow of the cooling medium based on said temperature detected.

5. A gas turbine engine configured for combined cooling of engine air for use in an engine system and aircraft air for use in an aircraft air system of an aircraft by a single heat exchanger unit, the gas turbine engine comprising an engine system inlet exposed for connection with an engine air path in the aircraft, the engine system inlet leading to the engine system, and a bleed air outlet exposed for connection with a bleed air path leading to the single heat exchanger unit, the bleed air outlet being in fluid flow communication with a compressor stage of the engine, the bleed air path splitting into an aircraft air path leading to the aircraft system and the engine air path downstream from the single heat exchanger unit; wherein the engine air path leads to bearing cavities of bearings of rotary components of the gas turbine engine and the aircraft air path leads to an environmental control system of the aircraft,
    wherein the aircraft air path delivers a first portion of the bleed air to satisfy an environmental cooling requirement and the engine air path delivers a second portion of the bleed air to fulfill a bearing air requirement;
    wherein the single heat exchanger has an operating envelope spanning from a high-power/low altitude region to a low-power/high altitude region and a capacity based on the entire operating envelope and
    wherein the heat exchanger fulfills the environmental cooling requirement and the bearing air requirement across the entire operating envelope, wherein:
        i) in the high-power/low altitude region of the operating envelope the first portion of the bleed air has a greater flow rate than the second portion of the bleed air; and
        ii) in the low-power/high altitude region of the operating envelope the second portion of the bleed air has a greater flow rate than the first portion of the bleed air.

6. The gas turbine engine of claim 5 wherein the aircraft air path has a pressure regulation and shut-off valve downstream of the splitting from the engine air path.

7. A cooling system for an aircraft having a gas turbine engine, the cooling system comprising:
    a heat exchanger unit;
    a bleed air path leading from the gas turbine engine to the heat exchanger;
    a cooling path for bringing cooling medium in thermal exchange contact with bleed air in the heat exchanger;
    an engine air path in gas flow communication with the bleed air path through the heat exchanger, leading from the heat exchanger to the engine, the engine air path leading to bearing cavities of bearings of rotary components of the gas turbine engine; and
    an aircraft air path in gas flow communication with the bleed air path through the heat exchanger, leading from the heat exchanger to an environmental control system of the aircraft;
    wherein the aircraft air path delivers a first portion of the bleed air to satisfy an environmental cooling requirement and the engine air path delivers a second portion of the bleed air to fulfill a bearing air requirement;
    wherein the heat exchanger has an operating envelope spanning from a high-power/low altitude region to a low-power/high altitude region and a capacity based on the entire operating envelope and wherein the heat exchanger fulfills the environmental cooling requirement and the bearing air requirement across the entire operating envelope, wherein:
        i) in the high-power/low altitude region of the operating envelope the first portion of the bleed air has a greater flow rate than the second portion of the bleed air: and
        ii) in the low-power/high altitude region of the operating envelope the second portion of the bleed air has a greater flow rate than the first portion of the bleed air.

8. The cooling system of claim 7 wherein the aircraft air path has a pressure regulation and shut-off valve.

9. The cooling system of claim 8 wherein the bleed air path splits into the engine air path and the aircraft air path downstream of the heat exchanger unit.

10. The cooling system of claim 8 wherein the bleed air path includes a low pressure path connecting to a low-pressure section of a compressor of the gas turbine engine, and a high-pressure path connecting to a high-pressure section of the compressor.

11. The cooling system of claim 10 wherein the low-pressure path includes a check valve and the high-pressure path includes a pressure regulation and shut-off valve.

12. The cooling system of claim 7 wherein the cooling path has an inlet located in a bypass duct of the gas turbine engine.

13. The cooling system of claim 7 further comprising at least one temperature sensor associated with at least one of the aircraft air path and the engine air path, a control valve associated with the cooling path, and a function to control the control valve based on an output from the at least one temperature sensor.

14. The cooling system of claim 7 wherein the heat exchanger is positioned in a pylon extending between the gas turbine engine and a wing or fuselage of the aircraft.

15. The cooling system of claim 9 wherein each of the bleed air path, the aircraft air path and the engine air path are formed by corresponding ducts, the engine air path duct forming a return duct from the heat exchanger to the engine.

16. The cooling system of claim 7 wherein the heat exchanger has a capacity based on a maximum value of a combined cooling requirement of both the engine air and the aircraft air, taken at a single point over the entire operating envelope.

17. The cooling system of claim 1 further comprising sensing the temperature of the first portion of the bleed air; sensing the temperature of the second portion of the bleed air; and controlling a rate of admission of the cooling medium based on the sensed temperatures of the first portion and of the second portion of the bleed air.

18. The cooling system of claim 7 wherein:
the engine air path has a peak demand in the region of high power/low altitude of the operating envelope; and
the aircraft air path has a peak demand in the region of low power/high altitude of the operating envelope.

\* \* \* \* \*